United States Patent
Devlin

[11] Patent Number: 5,537,952
[45] Date of Patent: Jul. 23, 1996

[54] PET SHEET BED COVER

[76] Inventor: Joseph T. Devlin, 37 Shamrock Rd., Rocky Point, N.Y. 11778

[21] Appl. No.: 218,432

[22] Filed: Mar. 28, 1994

[51] Int. Cl.⁶ ................................................. A01K 1/035
[52] U.S. Cl. ................................. 119/28.5; 5/484; 5/501
[58] Field of Search ......................... 119/28.5; 5/484,
5/482, 487, 495, 497, 501, 903, 473

[56] References Cited

U.S. PATENT DOCUMENTS

| | | | |
|---|---|---|---|
| 2,329,326 | 9/1943 | Bloomberg | 5/484 |
| 3,066,646 | 12/1962 | Bramley | 119/28 |
| 3,113,326 | 12/1963 | Hyde et al. | 5/484 |
| 3,763,907 | 10/1973 | Hockley et al. | 5/484 |
| 4,037,591 | 7/1977 | Sarno | 5/473 |
| 4,317,244 | 3/1982 | Balfour-Richie | 5/482 |
| 4,840,841 | 6/1989 | Madsen | 5/484 |
| 4,922,565 | 5/1990 | Blake | 5/484 |
| 5,197,411 | 3/1993 | Schwarzenbart | 119/28.5 |
| 5,226,384 | 7/1993 | Jordan | 119/28.5 |
| 5,265,294 | 11/1993 | McClure et al. | 5/473 |
| 5,265,558 | 11/1993 | Schörock | 5/473 |

FOREIGN PATENT DOCUMENTS

| | | | |
|---|---|---|---|
| 14281 | 8/1980 | European Pat. Off. | 5/473 |
| 1423917 | 11/1965 | France | 5/501 |

Primary Examiner—Gene Mancene
Assistant Examiner—Todd E. Manahan
Attorney, Agent, or Firm—Michael I. Kroll

[57] ABSTRACT

An improved pet sheet bed cover is provided for a bed having bedding on a mattress sitting on a box spring, which consists of a component for protecting the bedding from being soiled by a pet, such as from hairs, urine, feces, vomit and other animal debris. The protecting component is a bed covering fabricated out of waterproof and soil proof flexible material.

1 Claim, 2 Drawing Sheets

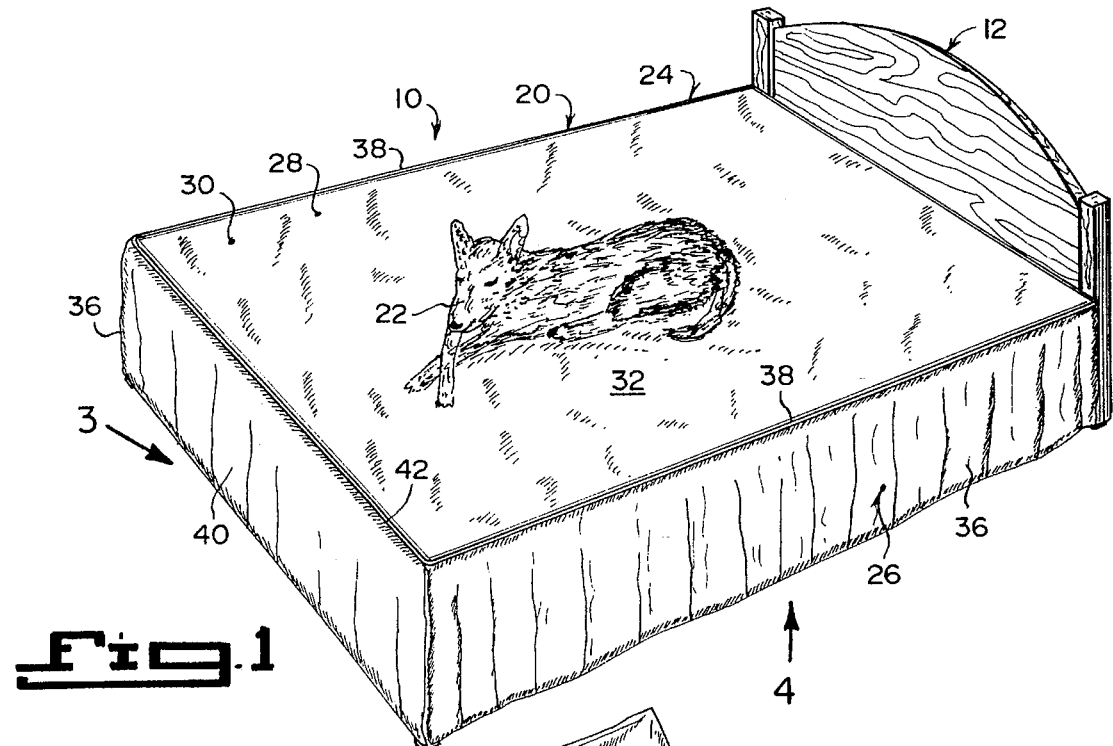
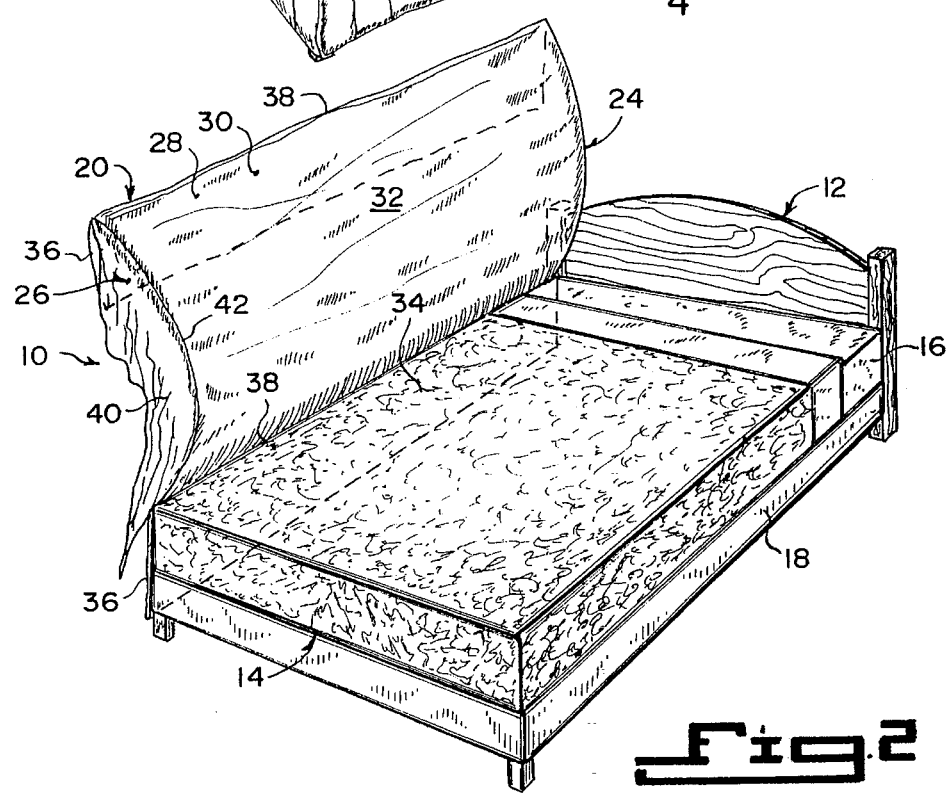

PET SHEET BED COVER

BACKGROUND OF THE INVENTION

1. Field of the Invention

The instant invention relates generally to bedding and more specifically it relates to an improved pet sheet bed cover.

2. Description of the Prior Art

Numerous types of bedding have been provided in prior art that are adapted to include coverings, quilted comforter and blankets used in conjunction with beds, so that people can utilize the bedding for resting and sleeping. While these units may be suitable for the particular purpose to which they address, they would not be as suitable for the purposes of the present invention as heretofore described.

SUMMARY OF THE INVENTION

A primary object of the present invention is to provide an improved pet sheet bed cover that will overcome the shortcomings of the prior art devices.

Another object is to provide an improved pet sheet bed cover that will protect bedding from being soiled by a pet, such as from hairs, urine, feces, vomit and similar materials.

An additional object is to provide an improved pet sheet bed cover that will fit over the existing bedding, so as to blend into the decor of the bed and the bedroom.

A further object is to provide an improved pet sheet bed cover that is simple and easy to use.

A still further object is to provide an improved pet sheet bed cover that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view taken from one side of a bed showing the instant invention applied onto the bed with a pet thereon.

FIG. 2 is a perspective view of the bed similar to FIG. 1, showing the instant invention in the process of being applied thereto.

DETAILED DESCRIPTION OF THE PREFERRED EMBODIMENTS

Figure 3:
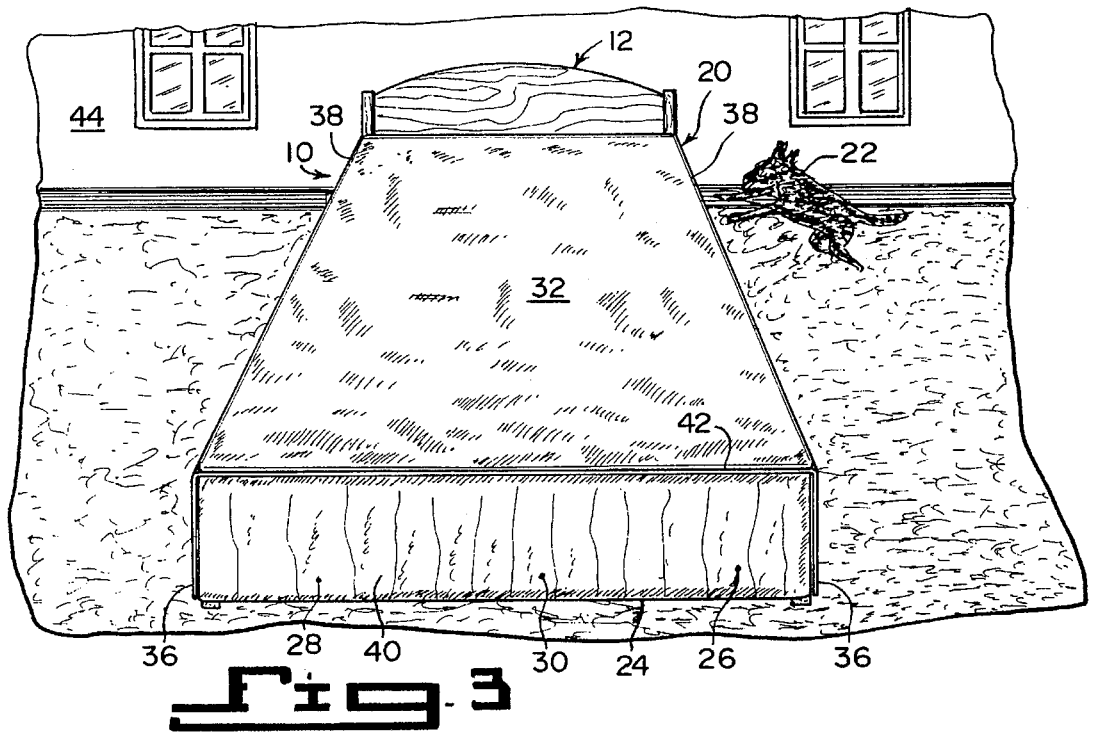
FIG. 3 is a perspective view taken in the direction of arrow 3 in FIG. 1, showing the pet ready to jump onto the bed.
Figure 4:
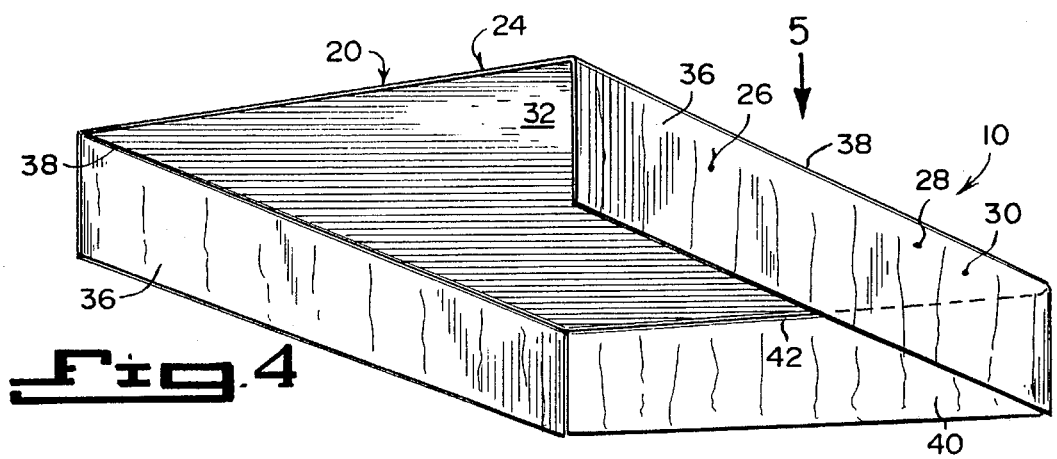
FIG. 4 is a bottom perspective view of the instant invention per se taken in the direction of arrow 4 in FIG. 1 and viewed from the head side thereof.
Figure 5:
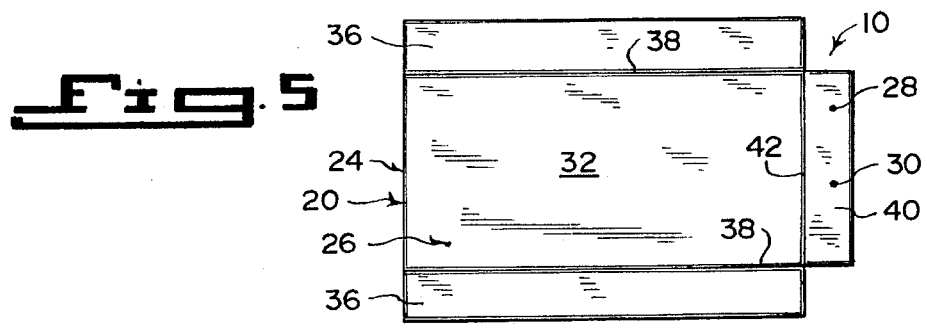
FIG. 5 is a top plan view of the instant invention taken in the direction of arrow 5 in FIG. 4, shown in an extended flat position.

Turning now descriptively to the drawings, in which similar reference characters denote similar elements throughout the several views, FIGS. 1 through 5 illustrate an improved pet sheet bed cover 10 for a bed 12 having bedding 14 on a mattress 16 sitting on a box spring 18, which consists of a component 20 for protecting the bedding 14 from being soiled by a pet 22, such as from hairs, urine, feces, vomit and similar materials. The protecting component 20 is a bed covering 24, fabricated out of waterproof and soil proof flexible material 26.

The waterproof and soil proof flexible material 26 is a layer of high density foam 28.

The bed covering 24 includes a panel 32 to fit upon and cover the top surface 34 of the bedding 14. The bed covering 24 further contains a pair of side skirts 36, each extending from one side of the panel 32, so as to hang down along the sides of the mattress 16 and the box spring 18, while covering the bedding 14 on the side of the mattress 16. The side skirts 36 are integral with the panel 32 along a fold line 38 therebetween.

The bed covering 24 also contains a foot skirt 40 extending from one end of the panel 32, so as to hang down along the foot of the mattress 16 and the box spring 18, while covering the bedding 14 on the foot of the mattress 16. The foot skirt 40 is integral with the panel 32 along a fold line 42 therebetween.

The bed covering 24 can be produced in various sizes and styles to fit most standard beds 12, typically but not limited to full, twin, queen and king size beds. The bed covering 24 can be produced in different color and print configurations, so as to be used in conjunction with other matching bedding 34, while blending into the decor of the bed 12 and the room 44 that the bed 12 is located in.

The bedding 14 can be a bed cover, a quilted comforter, a blanket, a quilt, a bedspread, a light coverlet and a bed sheet. The bedding 14 can also include a pillow with a pillowcase.

OPERATION OF THE INVENTION

To use the improved pet sheet bed cover 10, the following steps should be taken:

1. Place the panel 32 over the top surface 34 of the bedding 14 which is on the mattress 16 on the box spring 18 of the bed 12.
2. Make sure that the panel 32 is in the proper position on the bedding 14 with the foot skirt at the foot of the mattress 16 and the side skirts at the opposite sides of the mattress 16.
3. Fold the first side skirt 36 down along the first fold line 38, so that it covers the bedding 14 on the side of the mattress 16 and the box spring 18.
4. Fold the second side skirt 36 down along the second fold line 38, so that it also covers the bedding 14 on an opposite side of the mattress 16 and the box spring 18.
5. Fold the foot skirt 40 down along the fold line 42, so that it covers the bedding 14 on the foot of the mattress 16 and the box spring 18.
6. When the pet 22, such as a dog or cat, jumps up upon the bed 12, the hairs, urine, feces, vomit and other animal debris will be prevented from contacting and soiling the bedding 14.

LIST OF REFERENCE NUMBERS 10 improved pet sheet bed cover
12 bed
14 bedding 16 mattress of 12
18 box spring of 12
20 protecting component
22 pet
24 bed covering
26 waterproof and soil proof flexible material
28 layer of high density foam
30 plastic in 28
32 panel
34 top surface of 14
36 side skirt
38 fold line between 32 and 36
40 foot skirt
42 fold line between 32 and 40
44 room It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved pet sheet bed cover for a bed having bedding on a mattress sitting on a box spring, which comprises means for protecting the bedding from being soiled by a pet, said protecting means comprising a single sheet including a panel to fit upon and cover the top surface of the bedding, a pair of side skirts, each extending down from one side of said panel, so as to hang down along the sides of the mattress and the box spring, while covering the bedding on the side of the mattress, said side skirts being integral with said panel along a fold line therebetween, a foot skirt extending down from one end of said panel, so as to hang down along the foot of the mattress and the box spring, while covering the bedding on the foot of the mattress, said foot skirt being integral with said panel along a fold line therebetween and unattached to said side skirts while on said bed, said cover being waterproof and soil proof flexible material made from high density foam impregnated with plastic to repel pet urines, feces and vomit to prevent the aforesaid soiling of the bedding.

* * * * *